May 2, 1967  E. HUTTER  3,317,398
FUEL ELEMENT ASSEMBLY
Filed July 9, 1963  2 Sheets-Sheet 1
*PRIOR ART*
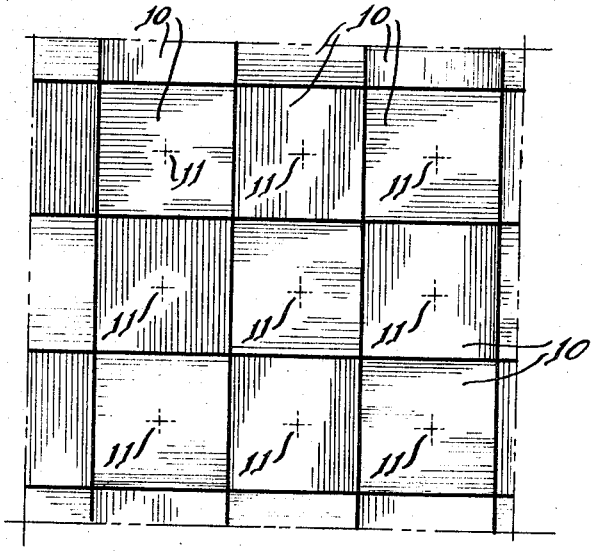
*PRIOR ART*
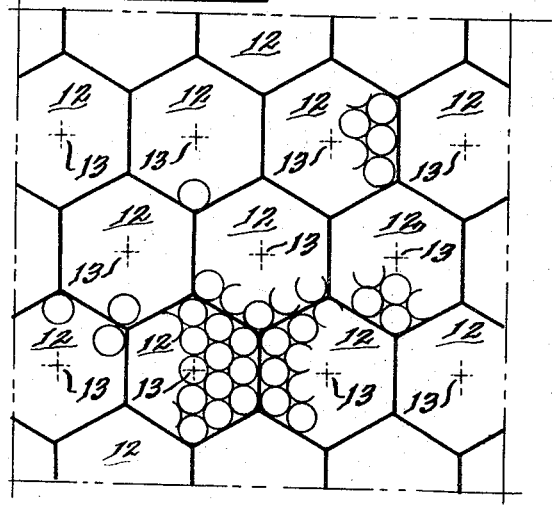
INVENTOR.
Ernest Hutter
BY
Roland A. Anderson
Attorney May 2, 1967  E. HUTTER  3,317,398
FUEL ELEMENT ASSEMBLY
Filed July 9, 1963  2 Sheets-Sheet 2

INVENTOR.
Ernest Hutter
BY
Roland A. Anderson
Attorney

United States Patent Office 3,317,398
Patented May 2, 1967

3,317,398
FUEL ELEMENT ASSEMBLY
Ernest Hutter, Chicago, Ill., assignor to the United States of America as represented by the United States Atomic Energy Commission
Filed July 9, 1963, Ser. No. 293,919
1 Claim. (Cl. 176—78)

The invention described herein was made in the course of, or under, a contract with the U.S. Atomic Energy Commission.

This invention relates to a fuel-element assembly for a nuclear reactor. More specifically, the invention relates to a fuel-element assembly of the rod type that is capable of being used in a nuclear reactor designed to use fuel-element assemblies of the plate type.

Nuclear reactors through which there is flowed a coolant such as liquid metal, pressurized water, or water being converted to steam may have either rods or plates as fuel elements. When plates are used, they best go together in assemblies of square or rectangular shape. When rods are used, they can be brought together in assemblies of square shape, but receive better lateral support, one against the other, when the assemblies are of hexagonal shape. When hexagonal assemblies of rods are juxtaposed to form a reactor core, their centers form a triangular lattice or pattern. When square assemblies of plates are brought together, their centers form a square lattice. Since coolant connections and end supports for fuel-element assemblies located in a containment structure at the ends of the reactor core are preferably centered on the fuel-element assemblies individually, such connections and supports should have a triangular arrangement for assemblies shaped like regular hexagons and a square arrangement for square assemblies.

Thus, conventional hexagonal rod assemblies and square plate assemblies are not interchangeable in a given reactor. Although these types of assemblies apparently need not be interchanged, since the rod-type reactor may well be quite different from the plate-type reactor, apart from the lattice arrangement, there is much benefit to be gained by interchangeability in the case of reactor research carried out on a low budget. Moreover, there may be some advantage in a permanent change from plate fuel elements to rod fuel elements, because rod elements in a hexagonal assembly are better supported laterally than plate elements.

An object of the present invention is to provide nuclear-fuel rod assemblies that support the rods one against the other in the manner of regular-hexagon assemblies and that are so shaped as to be brought together with their centers on a square lattice. Thus, the rod assemblies of this invention may replace square plate assemblies in a reactor.

In the drawings:

FIG. 1 is a diagrammatic view of an assembly of conventional square plate assemblies;

FIG. 2 is a diagrammatic view of an assembly of conventional regular-hexagon assemblies;

Figure 3:
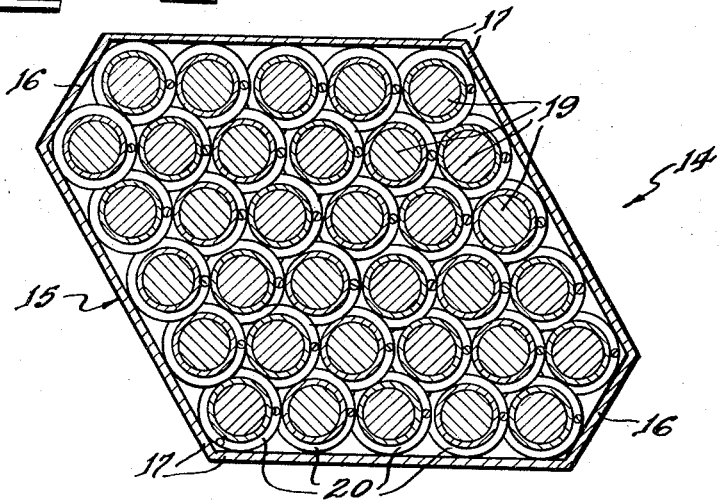
FIG. 3 is a transverse sectional view of a rod assembly of the present invention.

As shown FIG. 1, it is known to bring together square plate assemblies 10 of nuclear fuel in a nuclear reactor so that their centers 11 form a square lattice or pattern. Examples of this type of construction are to be found in Proceedings of the International Conference on the Peaceful Uses of Atomic Energy, 1955, volume 3, pages 57–68, Untermyer Patent 2,936,273, dated May 10, 1960, and Sherman et al. Patent 3,060,111, dated Oct. 23, 1962.

As shown in FIG. 2, it is known to bring together regular-hexagon rod assemblies 12 of nuclear fuel so that their centers 13 form a triangular lattice or pattern. Examples of this type of construction are to be found in Proceedings of the International Conference on the Peaceful Uses of Atomic Energy, 1955, volume 3, pages 134–142, Zinn Patent 2,841,545, dated July 1, 1958, and Koch et al. Patent 3,011,962, dated Dec. 5, 1961.

The square assemblies 10 of FIG. 1 cannot be interchanged with the hexagonal assemblies 12 of FIG. 2 in a given reactor, because the supporting or locating openings and the supply connections, which lie on the centers of the assemblies, will be arranged in a square lattice as shown by the centers 11 in FIG. 1 in a reactor designed for square assemblies and in a triangular lattice as shown by the centers 13 in FIG. 2 in a reactor designed for regular-hexagon assemblies.

Figure 4:
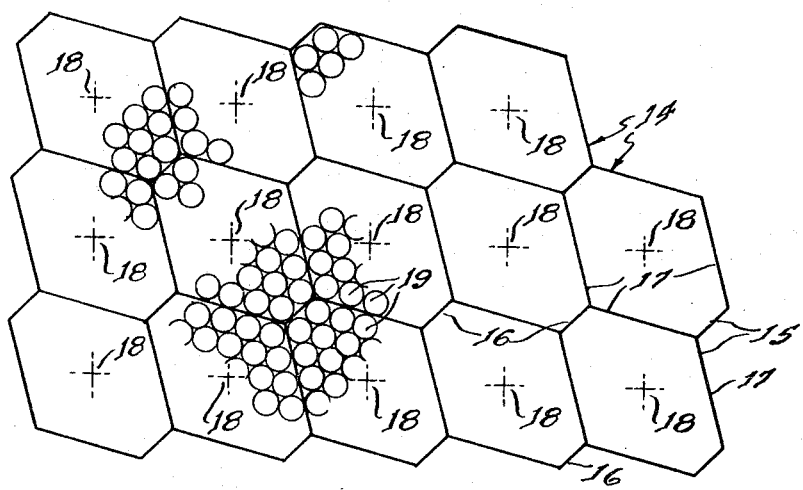
FIG. 4 is a diagrammatic view of an assembly of the rod assemblies of the present invention.

As shown in FIG. 3, an assembly 14 of the present invention includes a tube 15 having the shape of a hexagon provided with six interior angles, each of 120°, and two opposed relatively short sides 16 of equal length, and four relatively long sides 17 of equal length. When, as shown in FIG. 4, a plurality of assemblies 14 are brought together, their centers 18 lie on a square lattice or pattern. If the centers 18 have a spacing S from one another, the two short sides 16 of tube 15 have a length of S $$\left(\frac{\sqrt{2}}{2} - \frac{\sqrt{6}}{6}\right)$$

or 0.299S and the four long sides 17, a length of $S\sqrt{6}/3$ or 0.816S.

As is evident from FIG. 4, the diagonal of the square lattice or $S\sqrt{2}$ considered rightward and downward equals one half the height of one shell 15 measured across the short sides 16 plus one half the corresponding height of an adjacent tube 15. Thus the height of each shell equal $S\sqrt{2}$. As is also evident from FIG. 4, the diagonal of the square lattice or $S\sqrt{2}$ considered rightward and upward equals one half the diagonal of a tube 15 running parallel to the short sides 16 plus the length of a short side 16 of the next tube 15 plus one half the diagonal of the next tube 15. Thus, the length of a short side 16 of any tube 15 plus the diagonal parallel to the short side equals $S\sqrt{2}$.

From the preceding paragraph and the fact that each interior angle of the tube 15 is 120°, the length of the short side 16 is calculated as $$\left(\frac{\sqrt{2}}{2} - \frac{\sqrt{6}}{6}\right)$$

and the length of the long side 17, as $S\sqrt{6}/3$, as stated in the second preceding paragraph. The ratio of the length of the short side 16 to that of the long side 17 is $(3\sqrt{2}-\sqrt{6}):2\sqrt{6}$.

The example of the assembly 14 illustrated in FIG. 3 has a plurality of rods 19 each composed of a fissionable core, a corrosion-resistant jacket tightly engaging the core in a thermal bond, and a spiral spacing rib 20 attached to the jacket. The assembly 14 of the example has nine rows of rods 19 parallel to the short sides 16 and progressing in number by one from two to six and back to two.

It is to be observed from FIG. 3 the ribs 20 of the end rods 19 of each row of each assembly 14 engage the tube 15 of the assembly, and that each of the remaining or interior rods 19 is laterally supported on six sides by the spacing ribs 20 of the six rods directly surrounding the interior rod in question. Thus, there is ample lateral support for the rods 19 as is the case with the rods in a regular-hexagon tube and as is not the case with rods in a square tube in which each interior rod will be supported by only four rods. At the same time, the assemblies 14 of the present invention go together with their centers 18 on a square lattice or pattern so as to be capable of use in a reactor designed for square assemblies, in which reactor the connections and openings for the assemblies are in a square lattice.

It is understood that the invention is not to be limited by the details given herein but that it may be modified within the scope of the appended claim.

What is claimed is:

An assemblage of fuel assemblies fitting together and having their centers lying on a square lattice, each assembly comprising a plurality of nuclear-fuel rods and a tube enclosing the rods and being shaped as a hexagon having six 120° interior angles, two opposed relatively short sides, each having a length equal to the quantity 0.299 times the length of the side of the said square lattice, and four relatively long sides, each having a length equal to the quantity 0.816 times the length of the side of the said square lattice, each fuel rod being provided with a spiral spacing rib, the fuel rods of each assembly being arranged in rows parallel to the short sides of the hexagon of the tube, the number of rods per row progressing by one from two to six and back to two, the ribs of the fuel rods of each row of each assembly engaging the tube of that assembly, each of the remaining fuel rods of each assembly being laterally supported on six sides by the spacing ribs of the six fuel rods directly surrounding the rod in question.

References Cited by the Examiner

UNITED STATES PATENTS 2,841,545  7/1958  Zinn.
2,936,273  5/1960  Untermyer.

FOREIGN PATENTS 1,260,603  4/1961  France.

OTHER REFERENCES

GNEC–136, A 200-Mw(e) Boiler—Superheater Reactor Preliminary Design, October 1960, Fig. 4.

TID–7529 (Pt. 1), Reactor Heat Transfer Conference of 1956, November 1957, pages 248–261.

CARL D. QUARFORTH, *Primary Examiner.*

R. C. LYNE, M. J. SCOLNICK, *Assistant Examiners.*